United States Patent [19]
Jacobs

[11] 3,785,220
[45] Jan. 15, 1974

[54] CLUTCH DEVICE

[75] Inventor: James W. Jacobs, Dayton, Ohio

[73] Assignee: General Motors Corporation, Detroit, Mich.

[22] Filed: Oct. 10, 1972

[21] Appl. No.: 295,922

[52] U.S. Cl.................... 74/242.1 FP, 74/242.15 R
[51] Int. Cl................................................ F16h 7/12
[58] Field of Search............. 74/242.1 R, 242.1 FP, 74/242.8, 242.15 R, 242.1 TA, 242.11 R

[56] References Cited
FOREIGN PATENTS OR APPLICATIONS
1,007,634  5/1957  Germany...................... 74/242.1 FP Primary Examiner—Leonard H. Gerin
Assistant Examiner—Frank H. McKenzie, Jr.
Attorney—John P. Moran

[57] ABSTRACT

The drawings illustrate a belt-type clutch device wherein a pulley rotatably mounted on an arm pivotally mounted within the perimeter of an endless belt is urged or "teased" by a relatively small actuating force communicated thereto from any suitable power source, into a self-energizing or wedged relationship with the belt to thereafter be urged by the tractive action of the belt into an angular relationship therewith which results in the belt being fully tightened about its associated driving and driven pulleys.

5 Claims, 3 Drawing Figures

PATENTED JAN 15 1974    3,785,220

CLUTCH DEVICE

This invention relates generally to a belt-type clutch device and, more particularly, to such a device used to selectively actuate the drive shaft of an automotive accessory, such as an air-conditioning compressor.

While various clutching and/or driving devices are currently in use in conjunction with automotive air-conditioning compressors, such as electromagnetic clutches, for example, it may be advantageous for particular compressors or vehicular models to utilize an improved simplified belt-type clutch device wherein only a small actuating force need be applied to initiate a self-energizing, or inherent tractive action between the belt and an associated belt-tensioning pulley which thereupon efficiently completes the "clutching" or belt-tensioning operation connecting the compressor drive pulley to the crankshaft-driven pulley.

Accordingly, an object of the invention is to provide an improved, simplified belt-type clutch device of the type just described for use in conjunction with automotive air-conditioning compressors.

Another object of the invention is to provide an improved belt-type clutch device wherein a belt-tensioning pulley is rotatably mounted on a torque-responsive arm which, in turn, is pivotally mounted within the perimeter of an endless belt and having a suitable power source, such as a small vacuum actuator mechanism, associated with the torque-responsive arm for providing an initial actuation thereof sufficient to move the belt-tensioning pulley into a self-energizing relationship with the endless belt.

A further object of the invention is to provide an improved belt-type clutch device wherein a belt-tensioning pulley mounted on a pivotable torque-responsive arm within the perimeter of the belt is urged or teased by a relatively small actuating force into a predetermined angular or wedged relationship with the belt whereupon the resultant tractive action of the belt on the belt-tensioning pulley is sufficient to complete the pivoting of the pulley into a substantially perpendicular relationship with the initial path of the belt to tighten the belt around the driving and driven pulleys to thereby complete the drive connection therebetween.

These and other objects and advantages of the invention will be apparent when reference is made to the following description and accompanying drawings, wherein.

Figure 1:
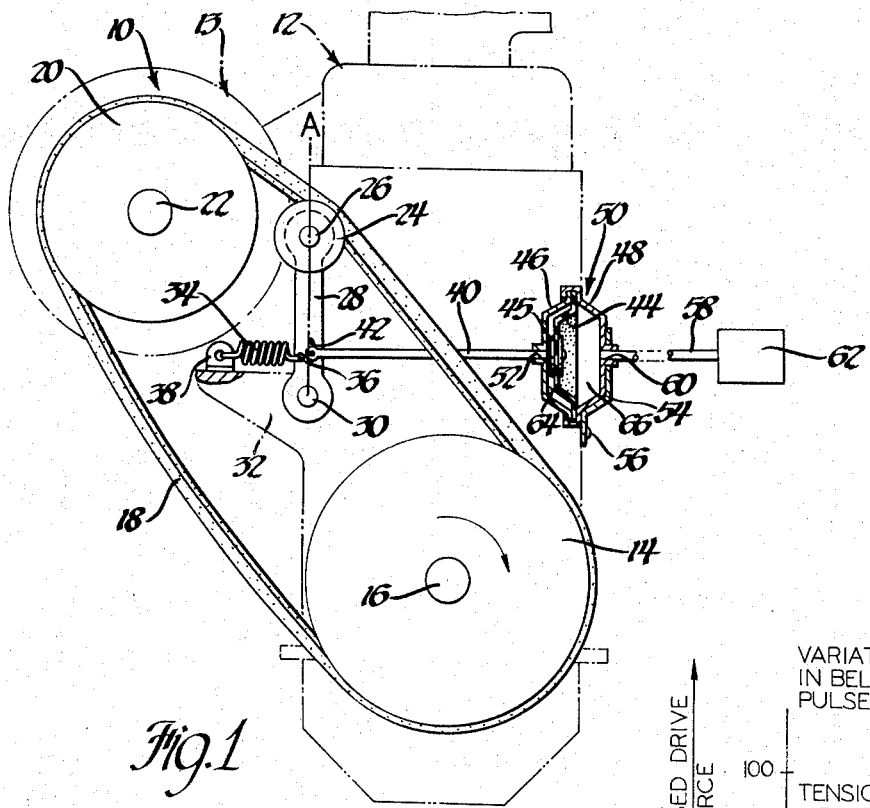
FIG. 1 is a plan view of the invention illustrating same in a nondriving condition.
Figure 2:
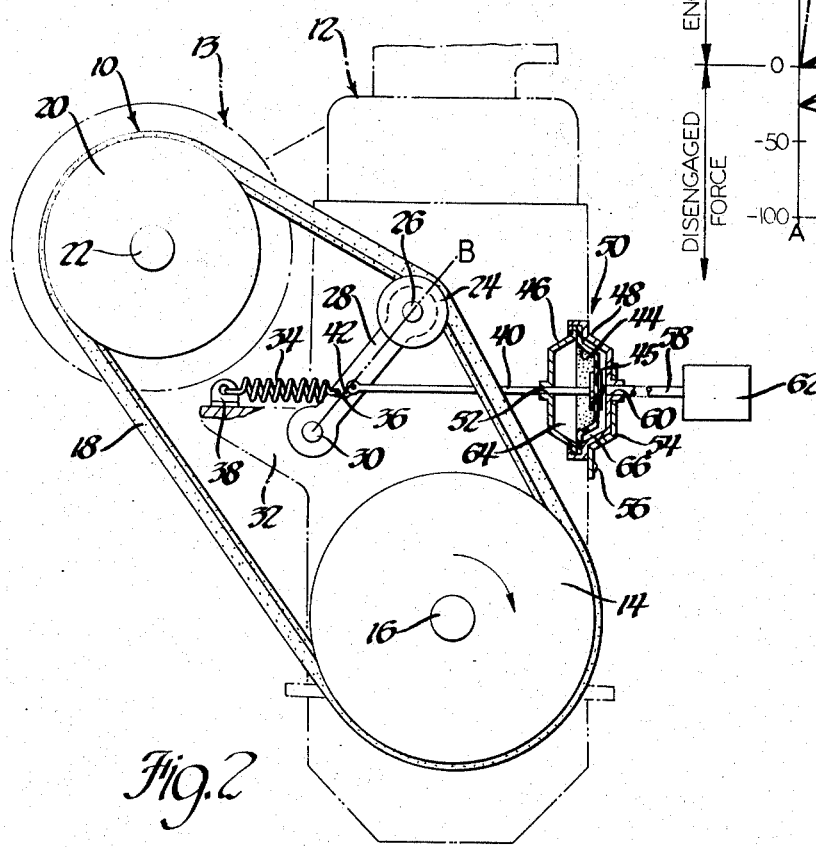
FIG. 2 is a plan view of the invention illustrating same in a fully engaged or driving condition.

Referring now to the drawings in greater detail, FIGS. 1 and 2 illustrate an automotive air-conditioning compressor drive system 10 operable in conjunction with an engine 12 and an air-conditioning compressor 13. The drive system 10 includes a drive pulley 14 connected to the engine crankshaft 16 for rotation therewith. An endless belt 18 is mounted around the drive pulley 14 and thence around a drive pulley 20, operable in this instance, for driving the air-conditioning compressor 13, the pulley 20 being mounted on the compressor drive shaft 22 and positioned adjacent the engine 12. A torque-responsive idler or belt-tensioning pulley 24 is rotatably mounted on a pin 26 supported on one end of a torque-responsive arm 28 which, in turn, is pivotally mounted at its other end on a pivot pin 30 secured to any suitable fixed abutment 32 formed on the engine 12. The torque-responsive arm 28 is initially mounted so as to cause the belt-tensioning pulley 24 to rotatably contact the inner surface of the belt 18 without applying any force thereto. The arm 28 is then pivotable between the initial loose position to approximately a 70° angle with respect to the path of the belt 18, and thence to substantially a 90° angle therewith in response to different actuating forces, as will be explained.

A return spring 34 is secured at one end thereof to an opening 36 formed in the torque-responsive arm 28 adjacent the pivot pin 30, and at the other end thereof to a spring retainer member 38 mounted on the fixed abutment 32. A linkage member 40 is secured at one end thereof to an opening 42 formed in the arm 28 adjacent the spring opening 36, and at the other end thereof to a diaphragm 44 by a suitable connector 45. The outer edge of the diaphragm 44 is confined between interconnected housing halves 46 and 48 of a suitable power source, such as a vacuum actuator mechanism 50, the linkage member 40 being slidably mounted through a sealed opening 52 formed in the housing half 46. A bracket 54 and bolt 56 may be used to secure the housing half 48 to a suitable outer surface of the engine 12. A vacuum inlet line or conduit 58 is secured at an end thereof to a port 60 formed in the housing half 48 and extends to a suitable source of vacuum, such as intake manifold vacuum, represented at 62. The diaphragm 44 serves as a movable wall, forming chambers 64 and 66 with the housing halves 46 and 48, respectively.

OPERATION

FIG. 1 illustrates the air-conditioning compressor drive system 10 in its nondriving condition, i.e., the outwardly extending torque-responsive arm 28 is at its predetermined minimum angle relationship with the belt 18, such that the belt 18 assumes a slack attitude intermediate the pulleys 14 and 20 so as to slip, without driving, on the crankshaft-driven pulley 14 and the compressor drive pulley 20.

Once vacuum is communicated from the source 62 throuGh the line 58 to the chamber 66 of the vacuum actuator mechanism 50, the diaphragm 44 is urged by atmospheric pressure in the chamber 64 to the right in FIG. 1. This rightward force serves to pivot the torque-responsive arm 28 in a clockwise direction about the pivot pin 30, thereby urging the pulley 24 from a merely contacting but noneffective position against the inner surface of the belt 18, to an angular position wherein the arm 28 and pulley 24 assume a predetermined "self-energizing" angular relationship with the path of the belt 18, i.e., preferably a 70°–75° angle therewith. Having once attained the latter angular relationship, the resultant tractive force of the belt on the pulley 24 causes the belt 18 to continue the urging of the pulley 24 in the clockwise direction, progressively tightentening or tensioning the belt 18. This action continues until the arm 28 attains substantially a 90° relationship with the initial path of the belt 18, the diaphragm connector 45 being abutted against the wall of the housing half 48 at this time to limit the 90° position.

Figure 3:
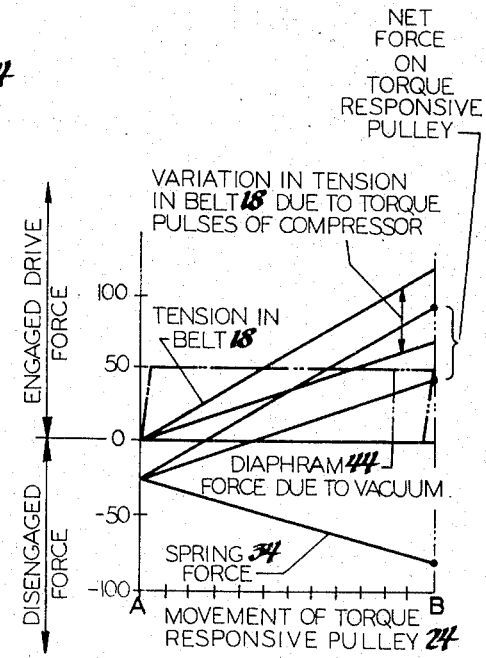
FIG. 3 is a graphic representation of the force characteristics of the invention while in the nondriving and driving conditions.

It should be noted that the force of the vacuum actuator mechanism 50 may be relatively small, for example, 50 pounds, as shown in FIG. 3, inasmuch as the mechanism 50 need not be a direct-acting actuator of the type which must supply all of the power necessary to effect sufficient tension in the belt 18 to drive the load, but, rather need only "tease" the belt-tensioning pulley 24 into the above-described self-energizIng relationship with the belt 18. However the force of the vacuum actuator 50 is large enough to hold the actuator arm 28 in the fully engaged position B, when combined with the self-energizing or tractive force developed by the belt 18. Consequently, when the vacuum actuator is deenergized, its force drops to "zero" (see FIG. 3), and the rest of the force system is insufficient to hold the arm 28 in the fully engaged position B, and the spring 34 returns the arm to the disengaged position A.

Referring now to the graphic illustrations of FIG. 3, wherein the initial disengaged and final full-engaged positions illustrated in FIGS. 1 and 2, respectively, are identified as A and B, respectively, consider, for example, the various typical forces involved for the drive position B. The return spring 34 force is noted to be approximately −75 pounds, indicating a leftward force in FIG. 2; the rightward force on the diaphragm 44 and, hence, on the linkage member 40, due to vacuum in the chamber 66 is approximately +50 pounds; the tension in the belt 18 is noted to vary between approximately +120 pounds and +65 pounds, the reduced force resulting from the normal torque pulses of the conventional compressor. There thus results a net force on the torque-responsive pulley 24 of a maximum of approximately +95 pounds and a minimum of approximately +40 pounds.

In the initial disengaged or nondriving position A, there is a leftward force on the arm 28 of approximately 25 pounds, due to the force of the spring 34, the diaphragm connector 45 being urged by the spring 34 against a suitable stop, such as the adjacent wall of the housing half 46.

It should be apparent that the invention provides an improved automotive air-conditioning compressor drive arrangement, wherein a relatively small actuating force on the part of a vacuum actuator mechanism utilizing engine intake manifold vacuum, for example, is sufficient to urge or tease the torque-responsive pulley located within the perimeter of the drive belt into the path of the belt to thereafter effectuate a self-energizing action between the belt and the pulley wherein the belt now causes the pulley arm to continue to pivot until it forces the belt outwardly into a tightly engaged relationship with the associated driving and driven pulleys.

It should be further apparent that a small electric solenoid or hydraulic cylinder could be substituted for the vacuum actuator mechanism illustrated to tease the belt-tensioning pulley into belt driving operation.

While but one embodiment of the invention has been shown and described, other modifications thereof are possible.

I claim:

1. For use with an automotive accessory unit, a belt-type clutch device comprising a drive pulley, a driven pulley operatively connected to said accessory unit, an endless belt initially loosely mounted around said drive and driven pulleys, a torque-responsive arm pivotally mounted at one end thereof within the perimeter of said endless belt, a belt-tensioning pulley rotatably mounted on the other end of said arm and contacting the inside surface of said endless belt, a spring connected to said arm urge said belt-tensioning pulley away from said inside surface of said endless belt, an actuating device, and a linkage member connected between said actuating device and said arm adapted to pivot said arm against the force of said spring and into a predetermined angular relationship with said belt upon the application of a relatively small force by said actuating device on said linkage member, said angular relationship being such that the resultant tractive action of said belt on said belt-tensioning pulley urges said arm into a substantially perpendicular relationship with the initial path of said belt to cause said belt-tensioning pulley to fully tighten said belt on said drive and driven pulleys to drive said accessory unit.

2. For use with an automotive air-conditioning compressor, a belt-type clutch device comprising a drive pulley, a driven pulley operatively connected to said air-conditioning compressor, an endless belt of a predetermined circumferential length so as to be mountable loosely around said drive and driven pulleys, a torque-responsive arm pivotally mounted at one end thereof within the perimeter of said endless belt, a belt-tensioning pulley rotatably mounted on the other end of said arm and contacting the inside surface of said endless belt, a spring connected to said arm to urge said belt-tensioning pulley away from said inside surface of said endless belt, a first stop means for limiting the movement of said spring, an actuating device, a linkage member connected between said actuating device and said arm adapted to pivot said arm against the force of said spring and into a predetermined angular relationship with said belt upon the application of a relatively small force by said actuating device on said linkage member, said angular relationship being such that the resultant tractive action of said belt on said belt-tensioning pulley urges said arm into a substaantially perpendicular relationship with the initial path of said belt to cause said belt-tensioning pulley to fully tighten said belt on said drive and driven pulleys to drive said air-conditioning compressor, and a second stop means for limiting the movement of said linkage member.

3. For use with an automotive air-conditioning compressor, a belt-type clutch device comprising a drive pulley, a driven pulley operatively connected to said air-conditioning compressor, an endless belt of a predetermined circumferential lenth so as to be mountable loosely around said drive and driven pulleys, a torque-responsive arm pivotally mounted at one end thereof within the perimeter of said endless belt, a belt-tensioning pulley rotatably mounted on the other end of said arm and contacting the inside surface of said endless belt, a spring connected to said arm to urge said belt-tensioning pulley away from said inside surface of said endless belt, an actuating device, a linkage member connected between said actuating device and said arm, a first stop member for limiting the movement of said linkage member and said spring in the spring-compressing direction, a source of power for said actuating device, the application thereof being sufficient to pivot said arm against the force of said spring and into a predetermined angular relationship with said belt, said angular relationship being such that the resultant tractive action of said belt on said belt-tensioning pulley thereupon urges said arm into a belt-tensioning relationship with said belt to fully tighten said belt on said drive and driven pulleys to drive said air-conditioning compressor, and a second stop member for limiting the movement of said linkage member in the spring-tensioning direction such that said arm maintains a maximum belt-tensioning substantially perpendicular relationship with the initial path of said belt until said application of actuating power from said source of power subsides.

4. The belt-type clutch device described in claim 3, wherein said actuating device is a vacuum-actuator mechanism.

5. The belt-type clutch device described in claim 4, wherein said vacuum-actuator mechanism includes a housing, a diaphragm retained at its outer edge in said housing, said linkage member being connected to the center portion of one side of said diaphragm, and an inlet from a source of vacuum into said housing on the other side of said diaphragm.

* * * * *